(12) United States Patent
Winter (10) Patent No.: US 9,213,118 B2
(45) Date of Patent: Dec. 15, 2015

(54) ROBUST STACKED SLIP-SWEEP METHOD AND SYSTEM

(71) Applicant: CGGVERITAS SERVICES SA, Massy (FR)

(72) Inventor: Olivier Winter, Massy (FR)

(73) Assignee: CGGVERITAS SERVICES SA, Massy (FR)

( * ) Notice: Subject to any disclaimer, the term of this patent is extended or adjusted under 35 U.S.C. 154(b) by 323 days.

(21) Appl. No.: 13/892,605

(22) Filed: May 13, 2013

(65) Prior Publication Data

US 2013/0308423 A1 Nov. 21, 2013

Related U.S. Application Data (60) Provisional application No. 61/648,687, filed on May 18, 2012.

(51) Int. Cl.
*G01V 1/00* (2006.01)
*G01V 1/36* (2006.01)
*G01V 1/37* (2006.01)

(52) U.S. Cl.
CPC .. *G01V 1/362* (2013.01); *G01V 1/37* (2013.01)

(58) Field of Classification Search
CPC ................................ G01V 1/362; G01V 1/37
USPC .......................................................... 367/38
See application file for complete search history.

(56) References Cited

U.S. PATENT DOCUMENTS

| | | |
|---|---|---|
| 3,398,396 A | 8/1968 | Embree |
| 5,410,517 A | 4/1995 | Anderson |
| 6,603,707 B1 | 8/2003 | Meunier et al. |
| 2010/0085837 A1* | 4/2010 | Iranpour ........................ 367/59 |
| 2012/0269034 A1* | 10/2012 | Neelamani et al. ............. 367/73 |
| 2012/0275266 A1 | 11/2012 | Eick et al. |

\* cited by examiner

*Primary Examiner* — Mark Hellner
(74) *Attorney, Agent, or Firm* — Patent Portfolio Builders PLLC (57) ABSTRACT

A method for processing seismic data including contiguous-sweep records corresponding to rotated sweep segments includes attenuating harmonics and generating stacked traces, each stacked trace being a weighted sum of traces corresponding to same location in the subsurface, based on seismic data from different seismic receivers, following plural shots at plural locations.

20 Claims, 9 Drawing Sheets

ROBUST STACKED SLIP-SWEEP METHOD AND SYSTEM

CROSS REFERENCE TO RELATED APPLICATIONS

This application claims priority and benefit from U.S. Provisional Patent Application No. 61/648,687, filed May 18, 2012, for "Robust Stacked Slip-Sweep," the entire content of which is incorporated in its entirety herein by reference.

BACKGROUND

1. Technical Field

Embodiments of the subject matter disclosed herein generally relate to methods and devices used for processing seismic data, and, more particularly, to methods and devices to process stacked slip-sweep data.

2. Discussion of the Background

Due to continued interest in developing new oil and gas production, large financial, technical and human resources are used for seismic surveys capable of generating a profile (image) of underground geophysical structures. While this profile does not provide an accurate location for oil and gas, it suggests, to those trained in the field, the presence or absence of oil and/or gas.

In seismic surveys, a seismic source generates seismic waves that penetrate the underground structure and are reflected back by interfaces between layers through which the seismic waves propagate with different velocities. Seismic receivers detect the reflected waves that carry information about the underground structure (e.g., location of the interfaces). Conventionally, a new shot is not fired while the seismic receivers still detect reflections from a previous shot.

Due to the high cost of seismic surveys, there is a continuous desire to improve productivity in seismic data acquisition, i.e., shortening the duration of seismic surveys. However, improving productivity should not result in degradation in data processing results' quality and reliability. Methods aimed at shortening the duration of seismic data acquisition explored techniques of firing shots simultaneously but far apart, overlapping seismic records corresponding to incident seismic waves having different phases, or overlapping records corresponding to different frequency ranges.

For example, according to a conventional method of firing land seismic sources, a "shot" includes four sweep segments of four seconds, during which incident seismic waves are generated, each sweep segment being followed by six seconds of listening time while seismic receivers detect and record data related to incident wave reflections. In the example above, the four sweep segments followed by listening time last a total time of 40 seconds. Afterwards, during a time period known as "MoveUp", the seismic source(s) is/are moved to another shot location. For example, the "MoveUp" may last about 30 seconds.

Accordingly, it would be desirable to provide systems and methods capable of processing acquired seismic data faster while simultaneously maintaining or improving the quality of the processed results.

SUMMARY

Methods for seismic data processing according to various embodiments described in this document process overlapping slip-sweep records attenuating harmonics and using diversity stacking.

According to one embodiment, there is a method for processing seismic data that includes receiving seismic data containing contiguous-sweep records, extracting individual sweep records of reflections detected by seismic receivers following each sweep segment, and processing the individual sweep records to obtain impulse-like events for the respective sweep segment. The method further includes attenuating harmonics of the sweep segment and generating stacked traces, each stacked trace being a weighted sum of traces corresponding to the same location in the subsurface, based on seismic data from different seismic receivers, following plural shots at plural locations.

According to another embodiment, there is a seismic data processing system with an interface that is configured to receive seismic data containing contiguous-sweep records, and a data processing unit. The data processing unit is configured (1) to extract individual sweep records of reflections detected by seismic receivers following each sweep segment, and to process the individual sweep records to obtain impulse-like events for the respective sweep segment, (2) to attenuate harmonics of the sweep segment, and (3) to generate stacked traces, each stacked trace being a weighted sum of traces corresponding to the same location in the subsurface, based on seismic data from different seismic receivers, following plural shots at plural locations.

According to yet another embodiment, there is a computer-readable recording medium non-transitorily storing executable codes which, when executed on a computer, make the computer perform a seismic data processing method. The method includes receiving seismic data containing contiguous-sweep records, extracting individual sweep records of reflections detected by seismic receivers following each sweep segment, and processing the individual sweep records to obtain impulse-like events for the respective sweep segment. The method further includes attenuating harmonics of the sweep segment and generating stacked traces, each stacked trace being a weighted sum of traces corresponding to the same location in the subsurface, based on seismic data from different seismic receivers, following plural shots at plural locations.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of seismic data acquisition and processing systems.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
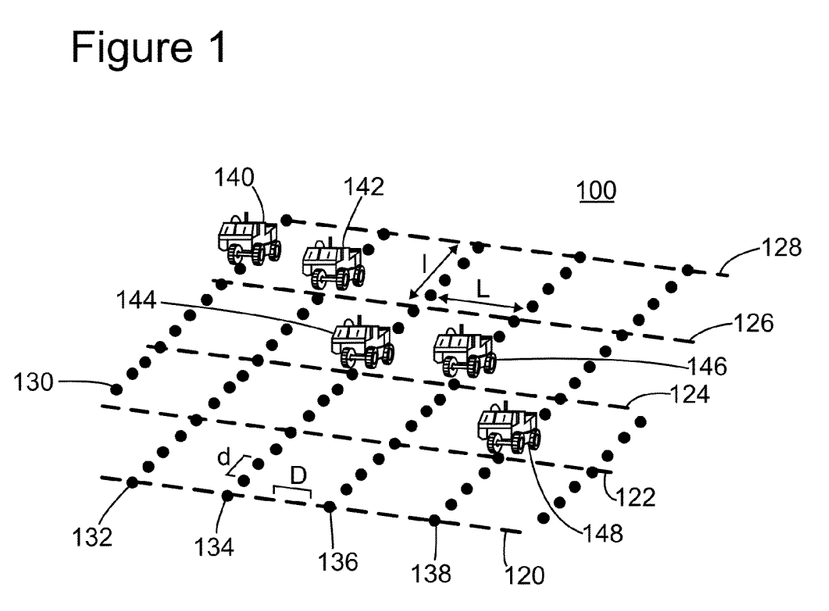
FIG. 1 is a schematic diagram of a land seismic survey system according to an embodiment.

A land seismic survey system 100 is schematically illustrated in FIG. 1. Parallel receiver lines 120, 122, 124, 126 and 128 on a flat surface are intersected by shot lines 130, 132, 134, 136 and 138 that are perpendicular to the receiver lines. The "parallel" and "perpendicular" characteristics should be considered an illustration and not a limitation.

The receiver lines are preferably arranged at regular intervals (I) of 100-250 m (e.g., 200 m from one another). Seismic receivers are located at predetermined and preferably regular distances (D), for example, in the range of 7.5 to 50 m (e.g., 25 m), along the receiver lines.

Plural seismic sources such as 140, 142, 144, 146 and 148 generating seismic waves may be mounted on trucks. Shots are fired at predetermined locations along the shot lines. Distances between adjacent shot locations (d) may be tens of meters. Distances between the shot lines (L) may also be tens to a few hundred meters. Concurrent with increasing data acquisition productivity, there is a tendency to increase shot point density. GPS signals may guide trucks carrying land seismic sources to shot locations.

A truck may carry one or more vibrators. Plural trucks may be placed at the same location or at adjacent locations. The vibrators generate controlled-frequency signals (known as sweep segments), the frequency varying within a range of 1-250 Hz. The frequency may increase (up-sweep) or decrease (down-sweep) linearly, logarithmically, exponentially or as a power function (i.e., $T^n$, where n=0.3–3) with time T during the sweep. Preferably, the frequency is increased (i.e., up-sweep) from 4 to 80 Hz, within 4 s. The vibrator generates seismic waves according to a pilot signal.

The following time segments are considered when using a vibrator to generate seismic waves: a sweep segment, a listening time and a move-up time. During the sweep segment that lasts a few seconds (e.g., 4 s), the controlled-frequency signal is generated. During the listening time that lasts seconds after the sweep segment, detectors receive reflections caused by the signal. During move-up time, the vibrator is moved to a next shot location. The vibrator may start moving to a next location as soon as its sweep segment ends although, depending on the surface, moving may cause noise over the reflections.

For example, a conventional sweeping method (without any slip, i.e., overlap) may be characterized by a sweep time of 4 s and a listening time of 6 s per vibrator. If four sweep segments are performed at the same location using one or plural vibrators, a shot (i.e., a complete set of sweep segments) occurs every 40 s.

Slip-sweep acquisition may allow a sweep segment to overlap a listening time from a previous sweep segment. For example, for the same slip time of 4 s and listening time of 6 s per vibrator, if the next sweep starts during the last two seconds of the previous listening time, a shot occurs every 32 s, resulting in a 25% productivity increase. In this case, the data recorded by the seismic receivers during a given listening time includes additional noise, for example, due to harmonics generated by the vibrator during a next sweep segment. Various data processing techniques may be then used to remove the resulting noise, to avoid degrading the quality of the subsurface image.

Cascaded sweeping is a data acquisition technique that may be employed to enable a more efficient removal of the noise due to the harmonics from the data. In cascaded sweeping, sweep segments are substantially identical, except that the initial phase angle of each sweep segment is different from the adjacent (in time) sweep segment(s), the initial phase angle being rotated by a constant phase increment of about 360/(N−1) degrees, where N is number of segments in a sequence. For example, for four sweep segments, their initial phases may be 0°, 120° and 240°, respectively. Another rotation scheme, such as, 0°, 120°, 240° and 0°, may be more favorable for conventional (i.e., non overlapping segments) acquisitions. However, the phase angle does not need to be increased in a progressive order (i.e., sequentially rotating the initial phase from a minimum value to a maximum value) because any order (e.g., 0°, 240°, 120°) yields the same overall effect.

Figure 2:
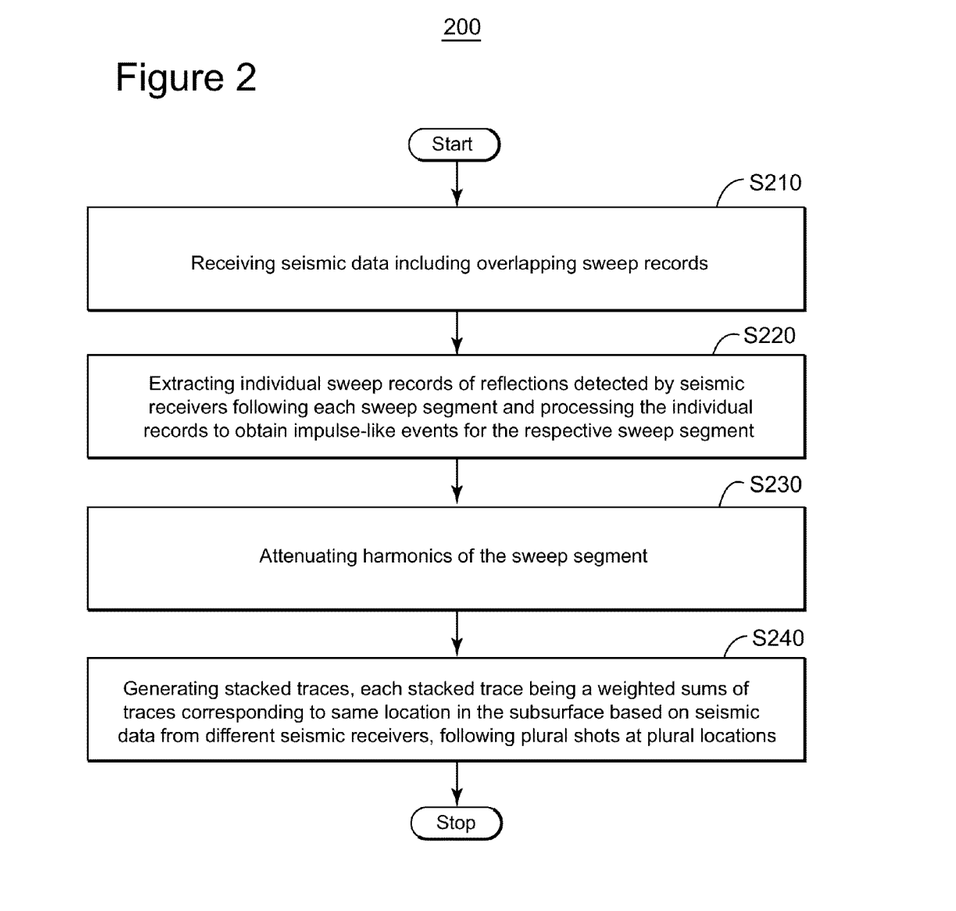
FIG. 2 is a flowchart of a method for processing seismic data according to an embodiment.

A flow diagram of a method 200 for processing seismic data acquired using slip-sweep is illustrated in FIG. 2. Method 200, which may be performed by a computing system having one or more data processing units, begins with receiving seismic data including overlapping sweep records at S210. The sweep records overlap because a new sweep has started before listening time for a previous sweep elapsed; the seismic data is also contiguous, without interruptions. This seismic data containing contiguous-sweep records is recorded based on reflections received by the seismic detectors along the receiver lines. The geometry of the seismic receivers is merely an example and is not intended to be limiting. The seismic data may represent sampled amplitudes (e.g., pressure variation at the seismic receivers) versus time. This amplitude versus time corresponds to an overlap of sweep-like reflections propagated back to the receivers from interfaces between sub-structure layers in which the seismic wave propagates with different velocities.

The sweep-like reflections last as long as the initial sweep segment (e.g., 4 s) and represent a convolution of the initial sweep and the subsurface reflectivity. In order to convert the sweep-like reflections into traces including impulse-type events, the raw records corresponding to each sweep segment are extracted from the data, and processed, at S220. This processing may include correlating each of the individual sweep records with a pilot signal that caused the respective sweep segment. Alternatively, the processing may include source signature deconvolution.

The results of step 220 are amplitude-versus-time graphs (traces) having impulse-like events at times corresponding to arrival at a receiver of a seismic wave traveling to and from the sub-surface layer interfaces.

Figure 3A:
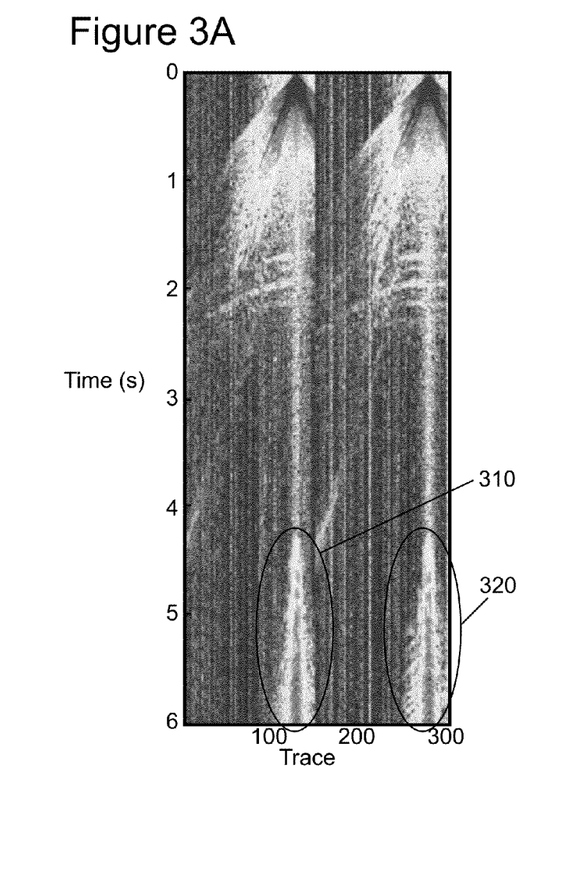
FIG. 3A illustrates vertically stacked raw data (without cascade processing)
Figure 3B:
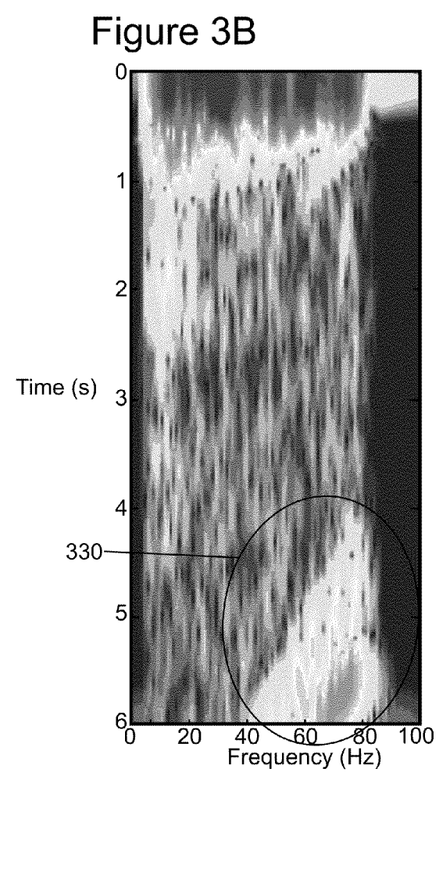
FIG. 3B is a time-versus-frequency graph corresponding to the raw data in FIG. 3A.

Method 200 further includes reducing noise due to harmonics of the initial sweep segment at S230. The seismic data acquired using slip-sweep includes harmonics of the sweep segment. For example, seismic data (acquired without rotating the initial phase of sweep segments and respective processing) with vertical stack (simple summation) of traces corresponding to a sequence of four slip-sweep segments is illustrated in FIG. 3A. FIG. 3A illustrates traces recorded by receivers located along two receiver lines closest to the shot location. On the x-axis of FIG. 3A is a receiver number (a number corresponding to a first receiver on the second receiver line following the number of the last receiver on the first line, the number sequence of receivers the same receiver line indicating also the spatial arrangement), and on the y-axis is time, the shading gradient corresponds to amplitude of envelope, being expressed as signal/noise ratio in a range of 0-(−70) dB. FIG. 3B is a time-versus-frequency graph corresponding to the seismic data in FIG. 3A. In FIGS. 3A and 3B, one can observe the harmonics in the last two seconds of the 6 s record, for example, in areas 310 and 320 in FIG. 3A and in area 330 in FIG. 3B.

Figure 4A:
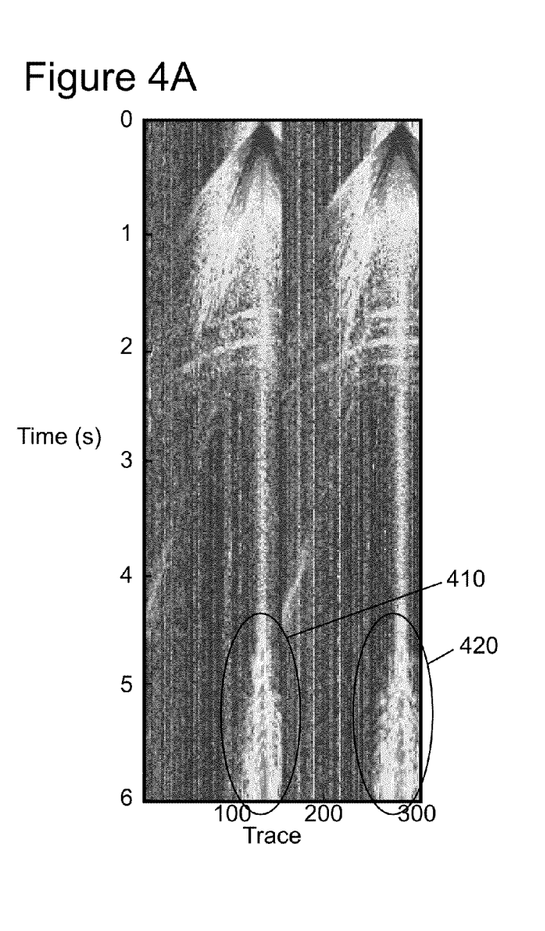
FIG. 4A illustrates vertically stacked seismic data, with cascade processing.
Figure 4B:
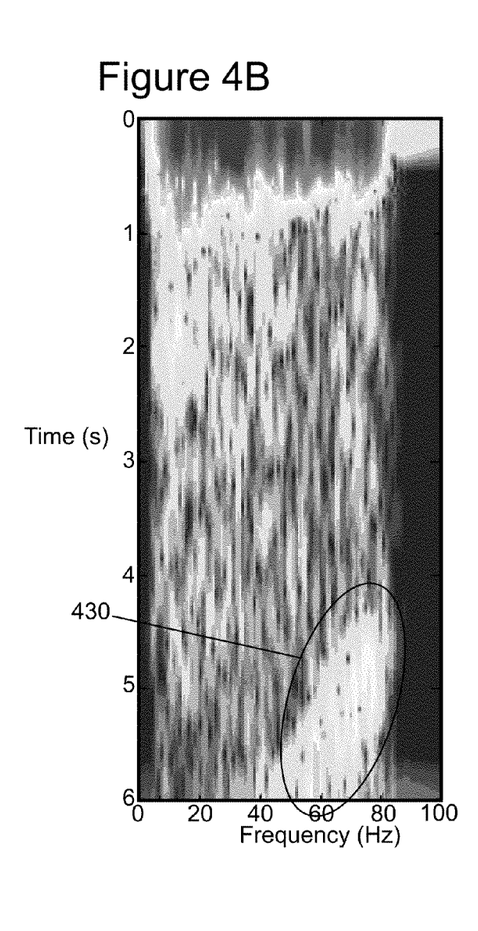
FIG. 4B is a time-versus-frequency graph corresponding to the data in FIG. 4A.

If the cascaded sweep method is employed for data acquisition and processing, the harmonics are attenuating due to the addition of traces corresponding to sweep segments having different initial phases. For example, seismic data with vertical stack (simple summation) of traces corresponding to a sequence of four cascaded slip-sweep segments (i.e., rotated to have different initial phases) is illustrated in FIG. 4A. FIG. 4A illustrates traces recorded also by receivers located along two receiver lines closest to the shot location. On the x-axis of FIG. 4A is a receiver number, and on the y-axis is time, the shading gradient corresponding to amplitude and being expressed as signal/noise ratio in dB. FIG. 4B is a time-versus-frequency graph corresponding to the seismic data in FIG. 4A. The cascaded sweep technique with four rotations only attenuates up to the fourth harmonic, but higher order harmonics are not negligible, their contribution remaining visible as emphasized by areas 410 and 420 in FIG. 4A and area 430 in FIG. 4B.

Further attenuation of harmonics in slip-sweep may be performed, for example, using a deterministic method for eliminating harmonics of a fundamental signal based on a time-versus-frequency plot, described in U.S. Pat. No. 6,603,707 (the content of which is incorporated by reference). In this method, known as high-productivity vibroseis analysis (HPVA), ground force is used to reduce the harmonics in the slip-sweep overlapping records. The source signature (i.e., seismic signal incident to the sub-surface) is measured using one or more seismic receivers placed near the source (e.g., under the base plate). This source signature is known as "ground force." Similar to the extracted records, the ground force is cross-correlated with the pilot signal.

Figure 5A:
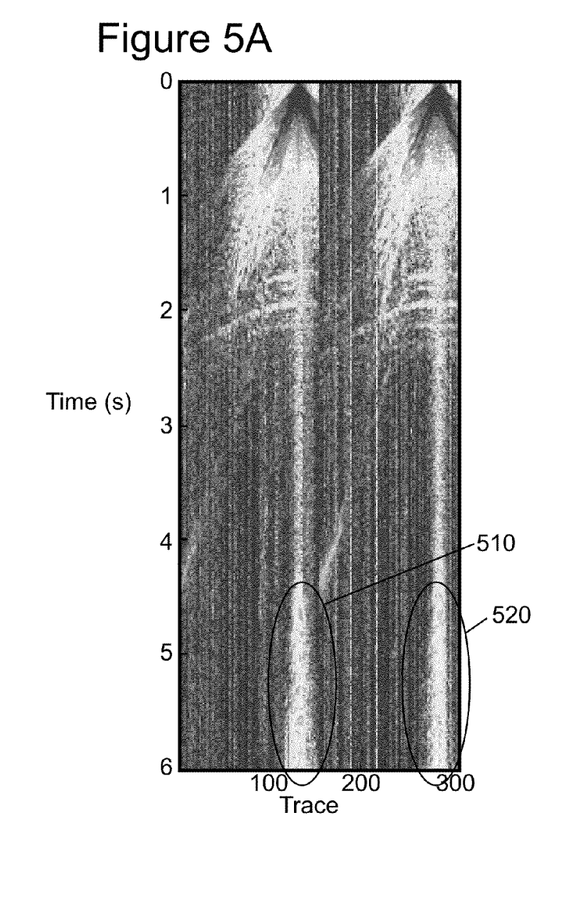
FIG. 5A illustrates vertically stacked seismic data without cascade processing but HPVA processed.
Figure 5B:
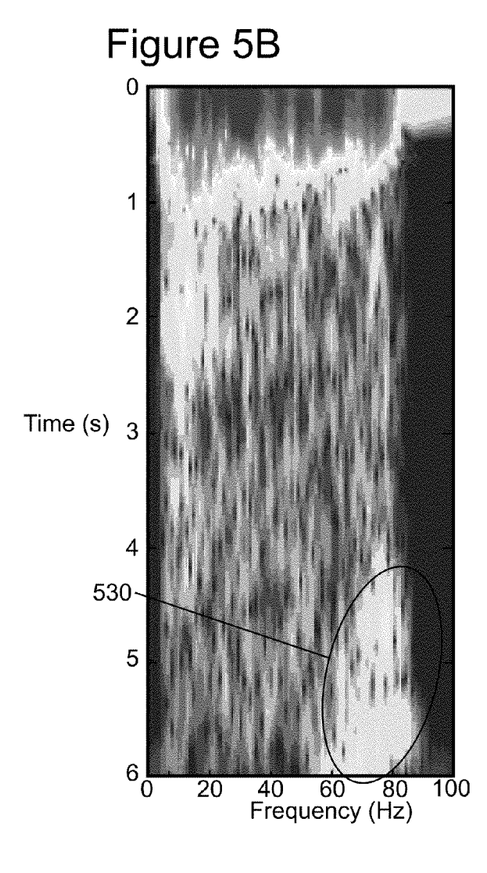
FIG. 5B is a time-versus-frequency graph corresponding to the data in FIG. 5A.

For example, HPVA-processed data with vertical stack (simple summation) of traces corresponding to a non-rotated sequence of four slip-sweep segments is illustrated in FIG. 5A, which illustrates 6 s records corresponding to traces recorded by receivers located along two receiver lines closest to the shot location. On the x-axis of FIG. 5A is a receiver number, and on the y-axis is time, the shading gradient corresponding to amplitude and being expressed as signal/noise ratio in dB. FIG. 5B is a time-versus-frequency graph corresponding to the seismic in FIG. 5A. In FIGS. 5A and 5B, one can observe a diminished signature of the harmonics relative to not using the HPVA method (e.g., 3A and 3B), during the last two seconds of the 6 s record. The signature of the harmonics is observed in areas 510 and 520 in FIG. 5A and in area 530 in FIG. 5B. The harmonics may be attenuated about 15 dB by using the HPVA method.

Figure 6A:
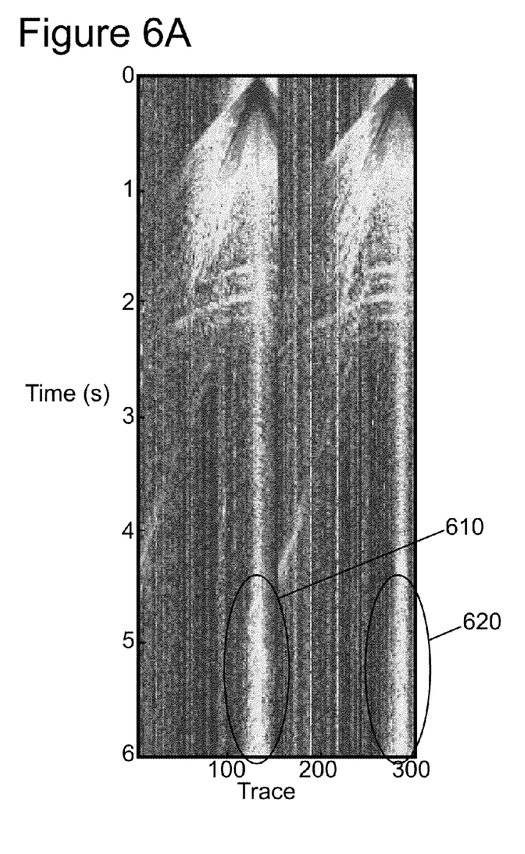
FIG. 6A illustrates vertically stacked seismic data with cascade and HPVA processing.
Figure 6B:
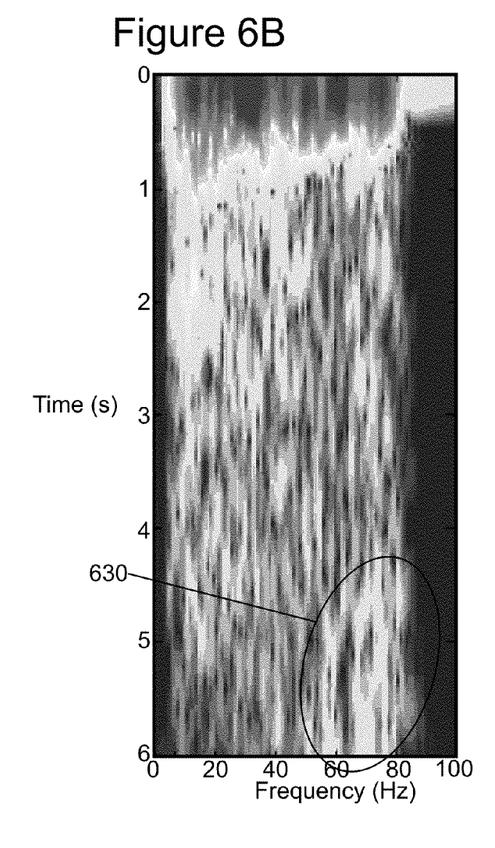
FIG. 6B is a time-versus-frequency graph corresponding to the data in FIG. 6A.

Furthermore, when the HPVA method is applied to cascaded slip-sweep segments (i.e., rotated to have different initial phases), additional attenuation of the harmonics is achieved. For example, HPVA-processed seismic data with vertical stack (simple summation) of traces corresponding to a cascaded sequence of four slip-sweep segments is illustrated in FIG. 6A. FIG. 6A illustrates traces recorded as in the other graphs by receivers located along two receiver lines closest to the shot location. On the x-axis of FIG. 6A is a receiver number, and on the y-axis is time, the shading gradient corresponding to amplitude and being expressed as signal/noise ratio in dB. FIG. 6B is a time-versus-frequency graph corresponding to the seismic data in FIG. 6A. In FIGS. 6A and 6B, one can observe a further diminished signature of the harmonics relative to not applying HPVA method to cascaded data (e.g., 5A and 5B), in the last two seconds of the 6 s record, for example, in areas 610 and 620 in FIG. 6A and in area 630 in FIG. 6B. The noise due to these harmonics may be attenuated by an additional 6 dB when the HPVA method is applied to cascaded data.

Returning now to FIG. 2, method 200 further includes a step of generating a weighted sum of traces as recorded by different seismic detectors at S240. The weight applied to a trace in the weighted sum may be inversely proportional to the noise power of the trace as described for example in U.S. Pat. No. 3,398,396 which is incorporated herewith by reference. This method of summing weighted traces is known as diversity stacking.

Figure 7A:
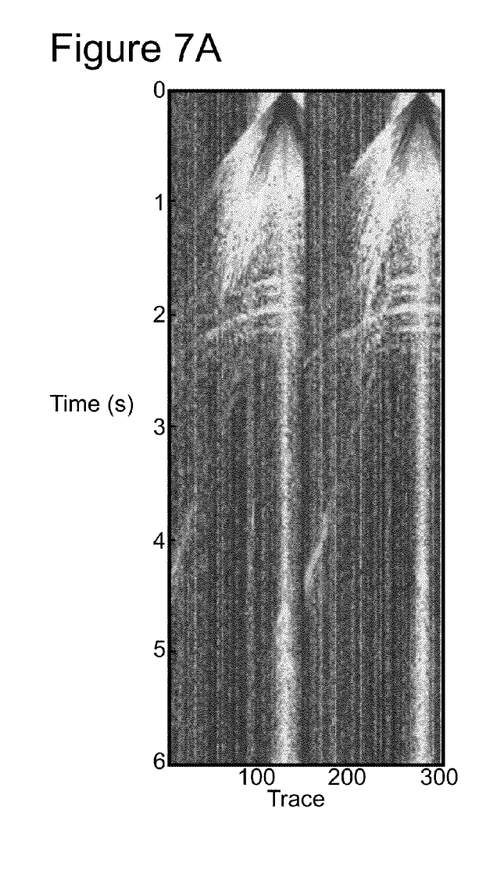
FIG. 7A illustrates stacked seismic data with cascade and HPVA processing, the data being stacked using weighted sums.
Figure 7B:
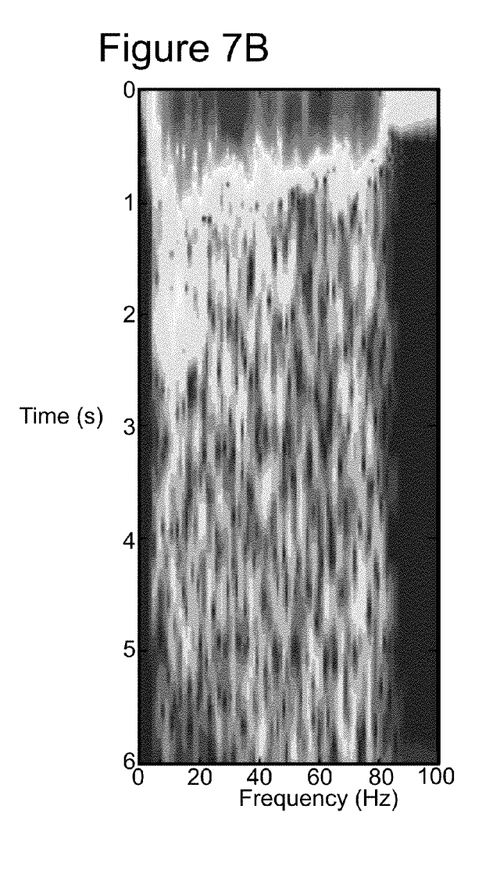
FIG. 7B is a time-versus-frequency graph corresponding to the raw data in FIG. 7A.

A result of diversity stacking applied to HPVA-processed rotated data is illustrated in FIGS. 7A and 7B. FIG. 7A illustrates HPVA-processed data with diversity stacking (i.e., weighted summation) of traces recorded also by receivers located along two receiver lines closest to the shot location and corresponding to a cascaded sequence of four slip-sweep segments. On the x-axis of FIG. 7A is a receiver number, and on the y-axis is time, the shading gradient corresponding to amplitude and being expressed as signal/noise ratio in dB. FIG. 7B is a time-versus-frequency graph corresponding to the seismic data in FIG. 7A. The signature of the harmonics in the last two seconds of the 6 s record has substantially disappeared.

The use of diversity stacking also has the advantage of removing ambient noise bursts, such as noise due to ice cracking.

Figure 8:
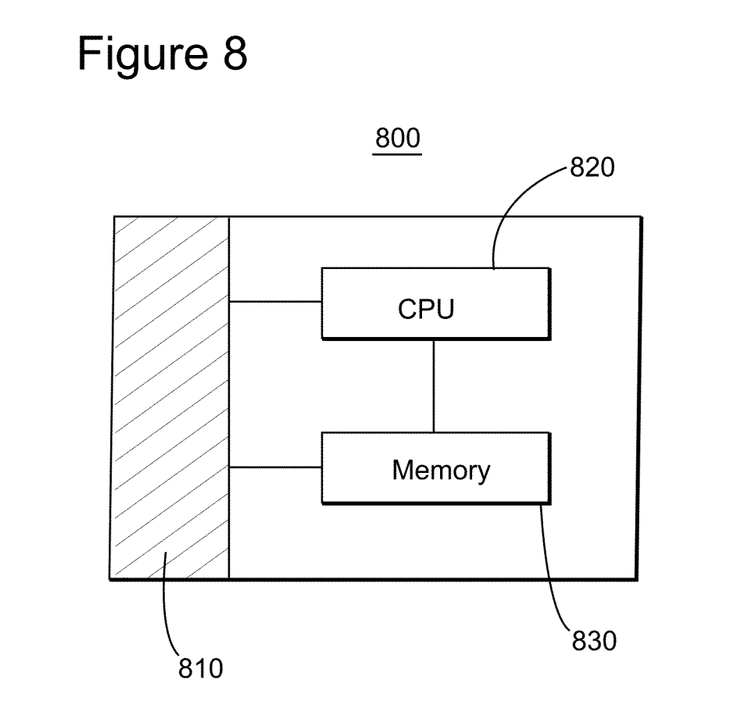
FIG. 8 is a block diagram of a seismic data processing system according to an embodiment.

FIG. 8 is a block diagram of a seismic data processing system 800 usable for performing seismic data processing according to an embodiment. The system includes an interface 810 configured to receive seismic data including overlapping sweep records, and a data processing unit 820.

The data processing unit 820 is connected to the interface 810 and is configured (1) to extract individual sweep records of reflections detected by seismic receivers following each sweep segment, and to process the individual sweep records to obtain impulse-like events for the respective sweep segment, (2) to attenuate harmonics of the sweep segment, and (3) to generate stacked traces, each stacked trace being a weighted sum of traces corresponding to the same location in the subsurface, based on seismic data from different seismic receivers, following plural shots at plural locations.

The system may also include a memory 830 to store seismic data and/or results of the seismic data processing. The memory 830 may also store computer-executable codes used by data processing unit 820. Additionally, the system may include a display configured to display images such as FIGS. 3-7 A and B, respectively.

Embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Figure 9A:
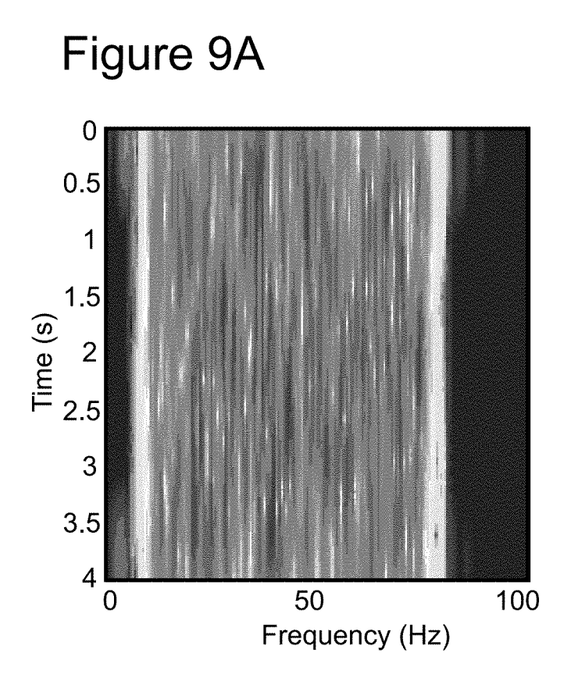
FIG. 9A is a time vs. frequency graph resulting from full length correlation.

Another method of removing the harmonics of the sweep segment is by taking into consideration shorter correlation times. As previously discussed one method of processing individual sweep records to obtain impulse-like events along a trace is by correlating the individual sweep record with the pilot signal that generated the respective sweep segment. In the conventional case, the listening time is long enough, so that the full length of the pilot signal is correlated using a sliding time window along the individual sweep record to identify based on matching impulse-like events. For example, FIG. 9A represents a time versus frequency graph of seismic data acquired for a 10 Hz to 80 Hz linear sweep of 7 s followed by a 4 s Listen Time and a 2 s Pause (i.e., no overlap and no harmonics of the sweep segment.

For seismic data acquired in contiguous sweep segments (Sweep+Pause, where 0<=Pause<=Listen Time), i.e., successive sweeps being fired at time intervals such that reflections from the successive sweeps overlap, a method for processing seismic data according to an embodiment includes the following steps:

cropping individual sweep records from the seismic data, so that CorrelationSegment has a Sweep+LTCorr length, where 0<=LTCorr<=Listen Time;

performing a full length correlation or signature deconvolution; and retaining data corresponding to the Listen Time.

Figure 9B:
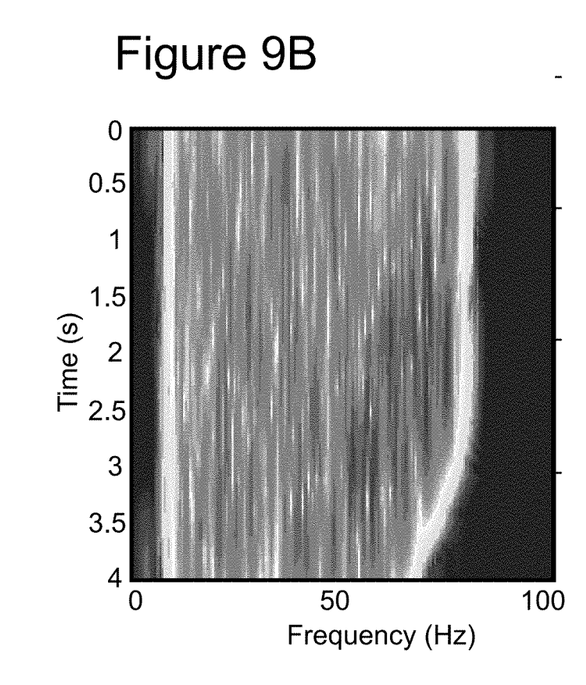
FIG. 9B is a time vs. frequency graph resulting from data acquisition and processing using a reduced correlation.

Note that LTCorr may be equal to Pause, but it is not required; LTCorr may be longer than Pause, but it is counterproductive to have it smaller. For example, an individual sweep record has a length of 9 s (conventionally, it should be 7 s+4 s, i.e., Sweep Length+Listen Time). A full sweep length correlation is performed retaining Listen Time. As a result, as illustrated in FIG. 9B, the full bandwidth 10-80 Hz is present in the first two seconds, but then the bandwidth present in the data decreases gradually. Thus, at time equal to 3 s, the bandwidth is 10-70 Hz, and, at time equal to 4 s, the bandwidth is 10-60 Hz. The absent higher-frequency signals likely do not harm the quality of the information because these higher-frequency signals are expected to be naturally attenuated at late times after the shot (i.e., weak signals).

The disclosed embodiments provide methods, devices and computer-readable recording medium for non-transitory storing executable codes for seismic data processing, the seismic data including overlapping records, and the processing resulting in attenuating harmonics of respective sweep segments. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for processing seismic data, comprising:

receiving seismic data containing contiguous-sweep records;

extracting individual sweep records of reflections detected by seismic receivers following a respective sweep segment and processing the individual sweep records to obtain impulse-like events for the respective sweep segment;

attenuating harmonics of the respective sweep segment; and generating stacked traces, each stacked trace being a weighted sum of traces corresponding to same location in the subsurface, based on seismic data from different seismic receivers, following plural shots at plural locations.

2. The method of claim 1, wherein a weight applied to a trace in the weighted sum is inverse proportional with noise power of the trace.

3. The method of claim 1, wherein the attenuating of the harmonics is performed using a deterministic method that uses a ground force recorded in parallel with the seismic data and correlated with the pilot signal.

4. The method of claim 1, wherein an order of the steps is: (1) the receiving step, (2) the extracting step, (3) the attenuating of the harmonics step, and (4) the generating of the stacked traces step.

5. The method of claim 1, wherein an order of the steps is: (1) the receiving step, (2) the attenuating of the harmonics step, (3) the extracting step, and (4) the generating of the stacked traces step.

6. The method of claim 1, wherein the seismic data is related to a data acquisition performed after shots at predetermined shot locations, each shot including a predetermined number of sweep segments, wherein a next sweep segment starts before a listening time following a sweep segment ends.

7. The method of claim 6, wherein at least two sweep segments of a shot have different initial phases.

8. The method of claim 7, wherein a phase difference between a sweep segment and a next sweep segment of the same shot is equal to 360° divided by the predetermined number of sweep segments minus one.

9. The method of claim 6, wherein the predetermined number of sweep segments is four.

10. The method of claim 1, wherein the processing of the individual sweep records to obtain the impulse-like events includes (A) correlating each of the individual sweep records with a pilot signal that caused the respective sweep segment, or (B) source signature deconvolution.

11. A seismic data processing system, comprising:
an interface configured to receive seismic data containing contiguous-sweep records; and
a data processing unit connected to the interface and configured
to extract individual sweep records of reflections detected by seismic receivers following a respective sweep segment and to process the individual sweep records to obtain impulse-like events for the respective sweep segment,
to attenuate harmonics of the respective sweep segment, and
to generate stacked traces, each stacked trace being a weighted sum of traces corresponding to same location in the subsurface, based on seismic data from different seismic receivers, following plural shots at plural locations.

12. The seismic data processing system of claim 11, wherein the data processing unit applies a weight to a trace in the weighted sum that is inverse proportional with noise power of the trace.

13. The seismic data processing system of claim 11, wherein the data processing unit attenuates the harmonics using a deterministic method that uses a ground force recorded in parallel with the seismic data and correlated with the pilot signal.

14. The seismic data processing system of claim 11, wherein the data processing unit performs: (1) extracting the individual sweep records, (2) processing the individual sweep records with the pilot signal (3) attenuating the harmonics, and (4) generating of the stacked traces in this order.

15. The seismic data processing system of claim 11, wherein the data processing unit performs: (1) attenuating the harmonics, (2) extracting the individual sweep records, (3) processing the individual sweep records, and (4) generating of the stacked traces in this order.

16. The seismic data processing system of claim 11, wherein the seismic data is related to a data acquisition performed after shots at predetermined shot locations, each shot including a predetermined number of sweep segments, each sweep record corresponding to a listening time following each sweep segment, wherein a next sweep segment starts before the listening time ends.

17. The seismic data processing system of claim 16, wherein at least two sweep segments of a shot have different initial phases.

18. The seismic data processing system of claim 17, wherein a phase difference between a sweep segment and a next sweep segment of the same shot is equal to 360° divided by the predetermined number of sweep segments minus one.

19. A computer readable recording medium non-transitorily storing executable codes which when executed on a computer make the computer perform a seismic data processing method comprising:
receiving seismic data containing contiguous-sweep records;
extracting individual sweep records of reflections detected by seismic receivers following a respective sweep segment and processing the individual sweep records to obtain impulse-like events for the respective sweep segment;
attenuating harmonics of the respective sweep segment; and
generating stacked traces, each stacked trace being a weighted sum of traces corresponding to same location in the subsurface, based on seismic data from different seismic receivers, following plural shots at plural locations, a weight applied to a trace in the weighted sum being inverse proportional with noise power of the trace.

20. The computer readable recording medium of claim 19, wherein the attenuating of the harmonics is performed using a deterministic method that uses a ground force recorded in parallel with the seismic data and correlated with the pilot signal.

* * * * *